(12) United States Patent
Mitz

(10) Patent No.: US 7,261,537 B2
(45) Date of Patent: Aug. 28, 2007

(54) FORCED HOT AIR ICE CREAM SCOOP

(76) Inventor: Howard S. Mitz, 580 St. Johnsbury Rd., Suite 1, Littleton, NH (US) 03561

( * ) Notice: Subject to any disclaimer, the term of this patent is extended or adjusted under 35 U.S.C. 154(b) by 729 days.

(21) Appl. No.: 10/757,869

(22) Filed: Jan. 15, 2004

(65) Prior Publication Data

US 2005/0155497 A1 Jul. 21, 2005

(51) Int. Cl.
*A23G 9/28* (2006.01)
(52) U.S. Cl. ............ 425/143; 425/276; 425/187; 425/170; 219/227
(58) Field of Classification Search ......... 425/276, 425/277, 187, 170, 143; 219/227, 228
See application file for complete search history.

(56) References Cited

U.S. PATENT DOCUMENTS

| | | | | |
|---|---|---|---|---|
| 2,166,810 A | * | 7/1939 | Gammeter | 425/277 |
| 2,260,689 A | * | 10/1941 | Miller | 425/187 |
| 3,138,153 A | * | 6/1964 | Osborn et al. | 601/168 |
| 3,515,853 A | * | 6/1970 | McAdams | 392/409 |
| 3,809,520 A | * | 5/1974 | Wilk et al. | 425/276 |
| 3,952,794 A | * | 4/1976 | Spanoudis | 165/58 |
| 6,441,345 B1 | * | 8/2002 | Usui | 219/228 |

\* cited by examiner

*Primary Examiner*—James P. Mackey
*Assistant Examiner*—Dimple Bodawala
(74) *Attorney, Agent, or Firm*—Bourque and Associates

(57) ABSTRACT

A forced hot air ice cream scoop and heater for facilitating the removal of ice cream from its container having a handle portion having a first end and a distal end, an inlet and an outlet at the first end of the handle portion, a body having a ladle disposed on the distal end of the handle portion, an air passageway extending from the inlet of the handle portion to the ladle and back to the outlet of the handle portion, wherein the passageway is in fluid connection with the inlet and the outlet, a heater having a heating element for generating heat and a blower for distributing the heat as hot air through the passageway, thereby heating the ladle. A temperature sensing device may be provided for sensing the temperature of the hot air, while an adjustable temperature setting device may also be provided for adjusting the temperature of the hot air. At least one port in the heater receives the first end of the handle portion of the forced hot air ice cream scoop, and an inlet air tube and an outlet air tube in fluid connection with the inlet and the outlet of the handle portion, respectively.

8 Claims, 2 Drawing Sheets

FORCED HOT AIR ICE CREAM SCOOP

TECHNICAL FIELD OF THE INVENTION

The present invention relates to an ice cream scoop, and more particularly to a forced hot air ice cream scoop having a handle portion and a ladle, wherein the ladle is heated with forced hot air to facilitate the scooping of ice cream from its container.

DESCRIPTION OF THE RELATED ART

It is known in the prior art to have an ice cream scoop for scooping ice cream from its container. Moreover, it is known in the prior art to have a heated ice cream scoop. There are a variety of ways to heat the ladle of the ice cream scoop, thereby facilitating the scooping of the ice cream and the separation of the ice cream from the ice cream scoop.

One type of heated ice cream scoop utilizes a resistance element for providing heat to the ladle of the ice cream scoop. In another type of heated ice cream scoop, an electrical element is used to heat the ladle of the ice cream scoop. In still another type of heated ice cream scoop, a flame is used to heat the ladle of the ice cream scoop. However, the flame is fueled by butane, which presents the possibilities of fire or burns to the user. Obviously, in many of the heated ice cream scoop devices, there are potential safety issues.

Therefore, there is a need for a safe an effective forced hot air ice cream scoop, which readily removes ice cream from its container and facilitates the separation of the ice cream from the ladle of the ice cream scoop. The present invention is directed toward this need.

SUMMARY OF THE INVENTION

The present invention is a novel forced hot air ice cream scoop and a heater. The forced hot air ice cream scoop has a handle portion and a ladle, wherein the ladle is heated with hot air to facilitate the scooping of ice cream from its container and the separation of the ice cream from the ladle. The forced hot air ice cream scoop receives hot air from a heater. The hot air is circulated through a passageway in the ladle of the forced hot air ice cream scoop, thereby heating the ladle.

BRIEF DESCRIPTION OF THE DRAWINGS

These and other features and advantages of the present invention will be better understood by reading the following detailed description, taken together with the drawings wherein.

DETAILED DESCRIPTION

Figure 1:
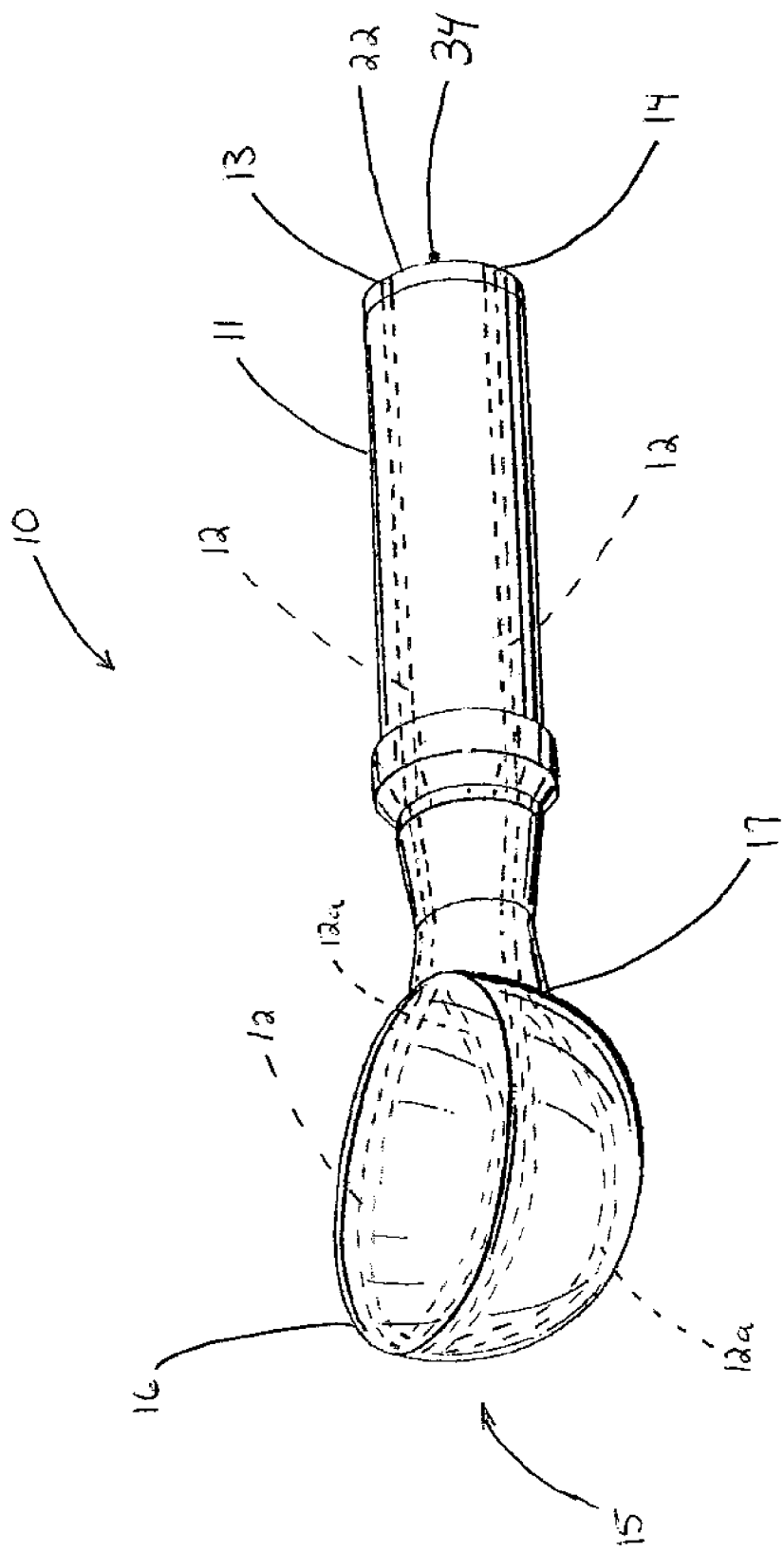
FIG. 1 is a perspective view of a forced hot air ice cream scoop according to the present invention.

A forced hot air ice cream scoop 10 according to the present invention is shown in FIG. 1. The forced hot air ice cream scoop 10 includes a handle portion 11 defining a portion of an air passageway 12. The handle portion 11 is made from or covered with a material that does not readily conduct heat, such as plastic. The passageway 12 has an inlet 13 and an outlet 14 adapted for flowing hot air.

The forced hot air ice cream scoop 10 has a body 15 having a ladle 16 disposed on a distal end 17 of the handle portion 11. The ladle 16 is made from a material that readily conducts heat, such as metal. In the preferred embodiment, the ladle 16 is concave shaped. The passageway 12 from the handle portion 11 extends to the ladle 16 and back to the handle portion 11. In an alternative embodiment, one or more ladle passageways 12a are located throughout the ladle 16 to provide additional means for heating the ladle 16.

Figure 2:
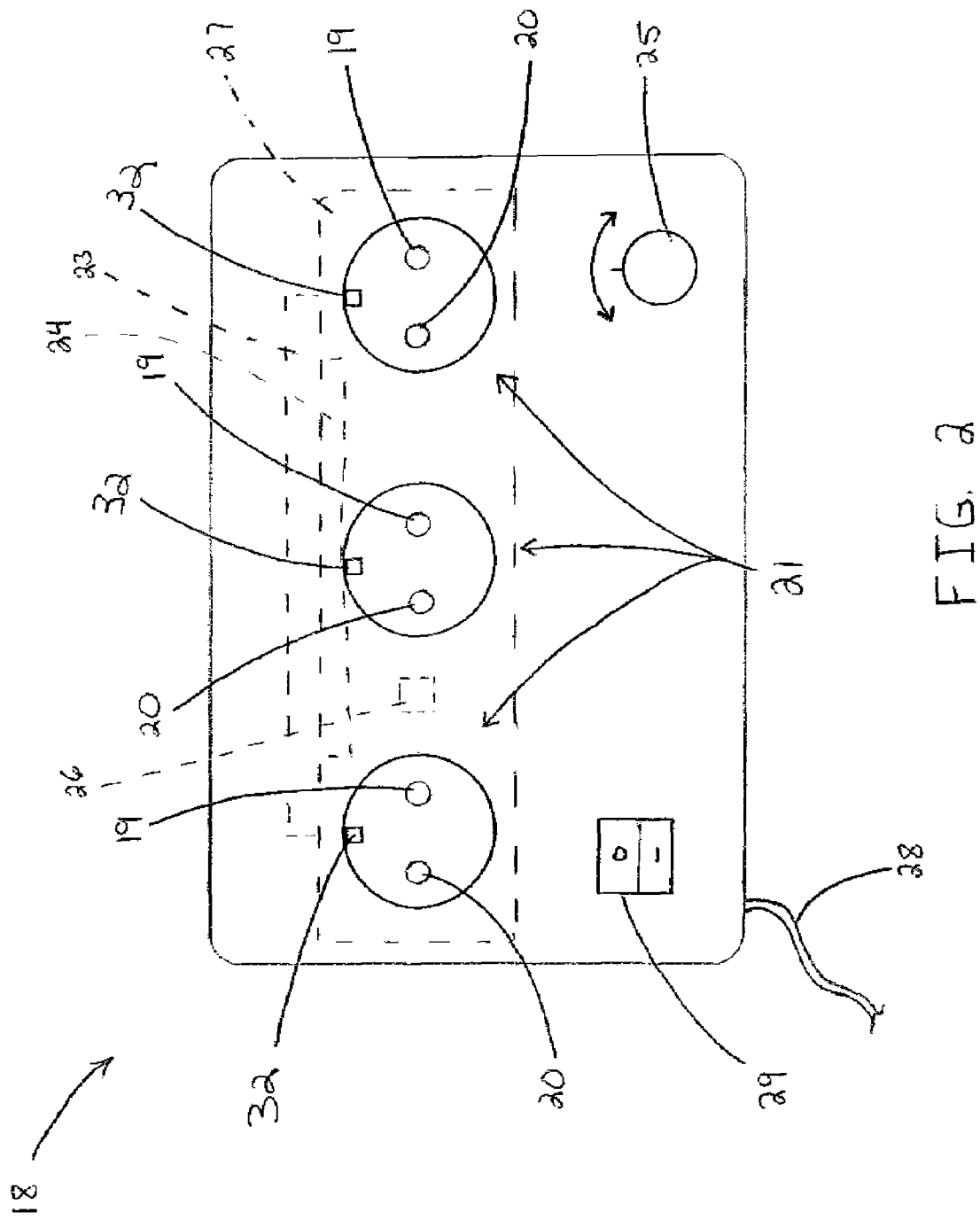
FIG. 2 is a top view of a heater for the forced hot air ice cream scoop according to FIG. 1.

The forced hot air ice cream scoop 10 is operatively connected to and in fluid connection with a heater 18, FIG. 2, when not in use or when heating is required. The heater 18 has at least one port 21 for receiving a first end 22 of the handle portion 11 of the forced hot air ice cream scoop 10. The heater 18 includes a heating element 24 and a blower 23 for generating and distributing hot air, respectively. The heater 18 has an on/off switch 29 for providing and precluding power to the blower 23 and the heating element 24.

The heater 18 also has an adjustable temperature setting 25 and a temperature sensing device 26 for controlling and adjusting the temperature of the hot air generated from the heating element 24. The temperature sensing device 26 may be any standard temperature sensing device such as a thermocouple, thermistor, resistance temperature detector, bimetallic thermometer, or semiconductor temperature sensor. The temperature sensing device 26 is advantageously in the form of a probe in communication with a heat chamber 27 in the heater 18. A power cord 28 is removably and operatively connected to the heater 18 for providing power thereto.

The heater 18 also preferably includes a device to turn the heater on and off, such as a micro-switch 29. The micro-switch 29 is operatively mounted in the at least one port 21 of the heater 19. When the handle 11 of the ice cream scoop is inserted in the port 21, the heater is energized and hot air is allowed to flow from an inlet air tube 19 of the heater 18 to the inlet 13 of the forced hot air ice cream scoop 10.

The heater 18 has the inlet air tube 19 and the outlet tube 20 that are operatively connected to and in fluid connection with the inlet 13 and the outlet 14, respectively, of the forced hot air ice cream scoop 10 during the heating process. The inlet tube 19 transfers the hot air generated from the heater 18 to the inlet 13 of the forced hot air ice cream scoop 10 and to the passageway 12. The hot air travels via the passageway 12 from the handle portion 11 to the ladle 16 and back again to the handle portion 11. In an alternative embodiment, the hot air also passes through the ladle passageways 12a. The hot air returning to the handle portion 11 is then directed to the outlet tube 20 of the heater 18 via the outlet 14 of the forced hot air ice cream scoop 10. The hot air returning to the heater 18 from the passageway 12 is reheated and circulated back through the passageway 12. Due to the hot air being circulated through the passageway 12 in the ladle 16, the ladle 16 is heated, which facilitates the scooping of ice cream from its container and removal of the ice cream from the ladle 16.

To use the forced hot air ice cream scoop 10, the power cord 28 of the heater 18 is plugged into a power source. The on/off switch 29 is placed in the "on" position and the adjustable temperature setting 25 is set to the desired temperature. The first end 22 of the forced hot air ice cream scoop 10 is placed into the at least one port 21 of the heater 18 such that the micro-switch 29 is activated allowing hot air to flow from the heater 18 to the passageway 12. The hot air is circulated through the passageway 12 in the forced hot air ice cream scoop 10, thus heating the ladle 16. The forced hot air ice cream scoop 10 is now ready for use. The heated ladle 16 makes it easier to scoop ice cream from its container and facilitates the separation of the ice cream from the ladle 16 upon placement into a serving medium, such as an ice cream cone, cup or the like. The forced hot air ice cream scoop 10 is placed back in the at least one port 21 of the heater 18 when the ladle 16 is not in use or needs to be heated again.

In an alternative embodiment, the passageway 12 and/or ladle passageway 12a are vented. In yet another alternative embodiment, the temperature sensing device 26 may be used to open and close a vent operatively mounted to preclude and allow air flow from the forced hot air ice cream scoop 10.

Modifications and substitutions by one of ordinary skill in the art are considered to be within the scope of the present invention, which is not to be limited except by the following claims.

What I claim is:

1. A forced hot air ice cream scoop for facilitating the removal of ice cream from a container, comprising:
   a handle portion having a first end and a distal end;
   an air passageway inlet and outlet proximate the first end of the handle portion;
   a body having a ladle disposed on the distal end of the handle portion;
   an air passageway extending from the inlet of the handle portion to the ladle and back to the outlet of the handle portion, wherein the passageway is in fluid connection with the inlet and the outlet; and
   a heater including:
   a heating element for generating heat;
   a blower for distributing the heat as hot air;
   a hot air outlet, coupled to said inlet of the handle portion of the ice cream scoop when said handle is inserted in a handle receiving port of said heater; and
   a hot air return inlet, coupled to said outlet of the handle of said ice cream scoop when said handle is inserted in said handle receiving port of said heater, said heater inlet, outlet, and handle inlet and outlet forming a hot air passageway for allowing hot air to flow through the passageway, thereby heating the ladle.

2. The forced hot air ice cream scoop of claim 1 further including a temperature sensing device for sensing the temperature of the hot air and an adjustable temperature setting device, operatively mounted to the heater, for adjusting the temperature of the hot air.

3. The forced hot air ice cream scoop according to claim 1, further comprising a micro-switch, for allowing and precluding hot air flow to the passageway.

4. The forced hot air ice cream scoop of claim 1, wherein the ladle is concave shaped.

5. The forced hot air ice cream scoop according to claim 3, wherein the ladle is metal.

6. The forced hot air ice cream according to claim 3, further including ladle passageways in fluid connection with the passageway.

7. The forced hot air ice cream scoop according to claim 4, further including a power cord electrically connected between a power source and the heater.

8. The forced hot air ice cream scoop according to claim 6, further including an on/off switch, for providing or precluding power to the heater.

* * * * *